United States Patent [19]
Strieber

[11] Patent Number: 5,806,294
[45] Date of Patent: Sep. 15, 1998

[54] WEED ELECTRIFIER

[76] Inventor: Louis Charles Strieber, 6800 W. Gate Blvd. #139B316, Austin, Tex. 78745

[21] Appl. No.: 790,215

[22] Filed: Feb. 1, 1997

Related U.S. Application Data

[60] Provisional application No. 60/011,206 Feb. 6, 1996.

[51] Int. Cl.[6] .................................................. A01M 21/04
[52] U.S. Cl. ................... 56/249; 56/1; 47/1.3; 126/271.1
[58] Field of Search .................................. 47/1.01 K, 1.3;
56/1, 12.7, 249, 244, 255; 30/276, 347;
172/13, 14, 15, 16, 17; 126/271.1

[56] References Cited

U.S. PATENT DOCUMENTS

| | | |
|---|---|---|
| 2,538,230 | 1/1991 | Boggs . |
| 3,559,337 | 2/1971 | Marcoux et al. ........................ 47/1.3 |
| 3,919,806 | 11/1975 | Pluenneke et al. . |
| 3,935,670 | 2/1976 | Pluenneke et al. . |
| 4,047,326 | 9/1977 | Tibbs . |
| 4,054,992 | 10/1977 | Ballas et al. . |
| 4,094,095 | 6/1978 | Dykes ........................................ 47/1.3 |
| 4,107,841 | 8/1978 | Rebhun . |
| 4,179,805 | 12/1979 | Yamada . |
| 4,183,138 | 1/1980 | Mitchell et al. . |
| 4,428,150 | 1/1984 | Geiersbach et al. ........................ 47/1.3 |
| 4,539,497 | 9/1985 | Boyer . |
| 4,627,322 | 12/1986 | Hayhurst, Jr. . |
| 4,916,886 | 4/1990 | Nakamura et al. . |
| 5,305,584 | 4/1994 | Hessabi ........................................ 56/1 |

*Primary Examiner*—Michael J. Carone
*Assistant Examiner*—Robert Pezzuto

[57] ABSTRACT

A portable, hand held tool for trimming and electrifying vegetation. The portable, hand swingable, weed trimmer passes electricity through its cutting or trimming element so as to pass electricity into the weeds to kill the roots of the weeds. The tool includes a power unit for rotation of a cutter drive. A pancake generator generates electricity via rotation of the cutter drive. Brushes between the pancake generator and the cutter blade conduct current to the cutter blade, which in turn permits the current to pass into the vegetation as the cutter blade trims the vegetation.

15 Claims, 3 Drawing Sheets

WEED ELECTRIFIER

This application is a continuation of Provisional Application Ser. No. 60/011,206, filed Feb. 6, 1996.

FIELD OF THE INVENTION

The present invention relates to hand held portable trimmers for the maintenance worker and landscaper and, more specifically, to such trimmers with means to deliver electricity to the weeds of the plants which it cuts.

SUMMARY OF THE INVENTION

A general object of the present invention is to provide a unique hand tool for trimming and electrifying vegetation.

Another object of the present invention is to provide in such a hand tool a unique arrangement for generating electricity in a trimmer. Specifically, the hand tool includes a generator in or adjacent to the trimmer head which generates electricity from the rotating drive shaft used to turn the blade or cutter that cuts the weeds.

Another object of the invention is to provide a unique add-on kit for a conventional weed eater. This add on and removable kit enables an individual to convert his or her conventional weed eater into a weed electrifier. Electrical treatment decreases the number of times an individual needs to trim weeds or poison them, saving fuel, money, and time, and reducing air pollution and the environmental impact of property upkeep. The present add on kit works even on a low powered weed eater. Most fueled motors have more than enough power to both cut the weeds and power the add on pancake generator.

One advantage of the present invention is that it enables one or more individuals to clear brush, including large trees, by a method that does not require poisons. The dead weeds remain in place until decomposed. The clearing of the brush, weeds, or vegetation is accomplished by electrocuting the weeds or other vegetation, which is relatively easy because weeds, which generally grow faster than the plants generally used as crops, are taller than the desired vegetation. Otherwise, the modified weed eater is manipulated with minimal touching of the plants grown as crops. The cutting apparatus is electrified and thus transfers electricity to the weeds and, more importantly, through the fluids of the plant to the roots of the weeds.

Even large trees such as weed trees, weesatch or mesquite, prickly ash, and stump sprouts may be electrified. Such is accomplished by trimming through the bark and into the cambium as close to the ground level as possible to reduce the chances of sprouts forming along the trunk.

It is preferred to treat the vegetation with electricity after a good rain, to enable the electricity to flow at least partially into the ground after it has flowed through the roots of the plant. In other words, current is carried from the generator, to the brushes, to the cutting tool, to the plant, to the plant's roots, and then further into the ground about the roots of the plant.

It is preferred that the vegetation is treated more than once. Seeds grown and perhaps even spread before treatment will sprout, producing weeds which then may be electrified before new seeds are generated. The larger weeds may be somewhat resistant and may have portions that grow back. However, two or more electrical treatments are preferable to regularly using a nonelectrified weed cutter or a poison.

It is preferable that the operator be safety conscious. For example, in addition to eye and ear protection, it is preferable to wear protective gear such as rubber gloves, rubber boots or chaps to protect from shock. Another example of a safety conscious operator is one who inspects the cutter for wear and tear, such as inspecting the cutting head, the cutting piece, the hub, the brushes, the teeth of the cutting piece, and balance of the cutting piece.

These and further objects and advantages of the present invention will become clearer in light of the following detailed description of the illustrative embodiments of this invention described in connection with the drawings.

BRIEF DESCRIPTION OF THE DRAWINGS

The illustrative embodiments may be best described by reference to the accompanying drawings where.

Figure 1:
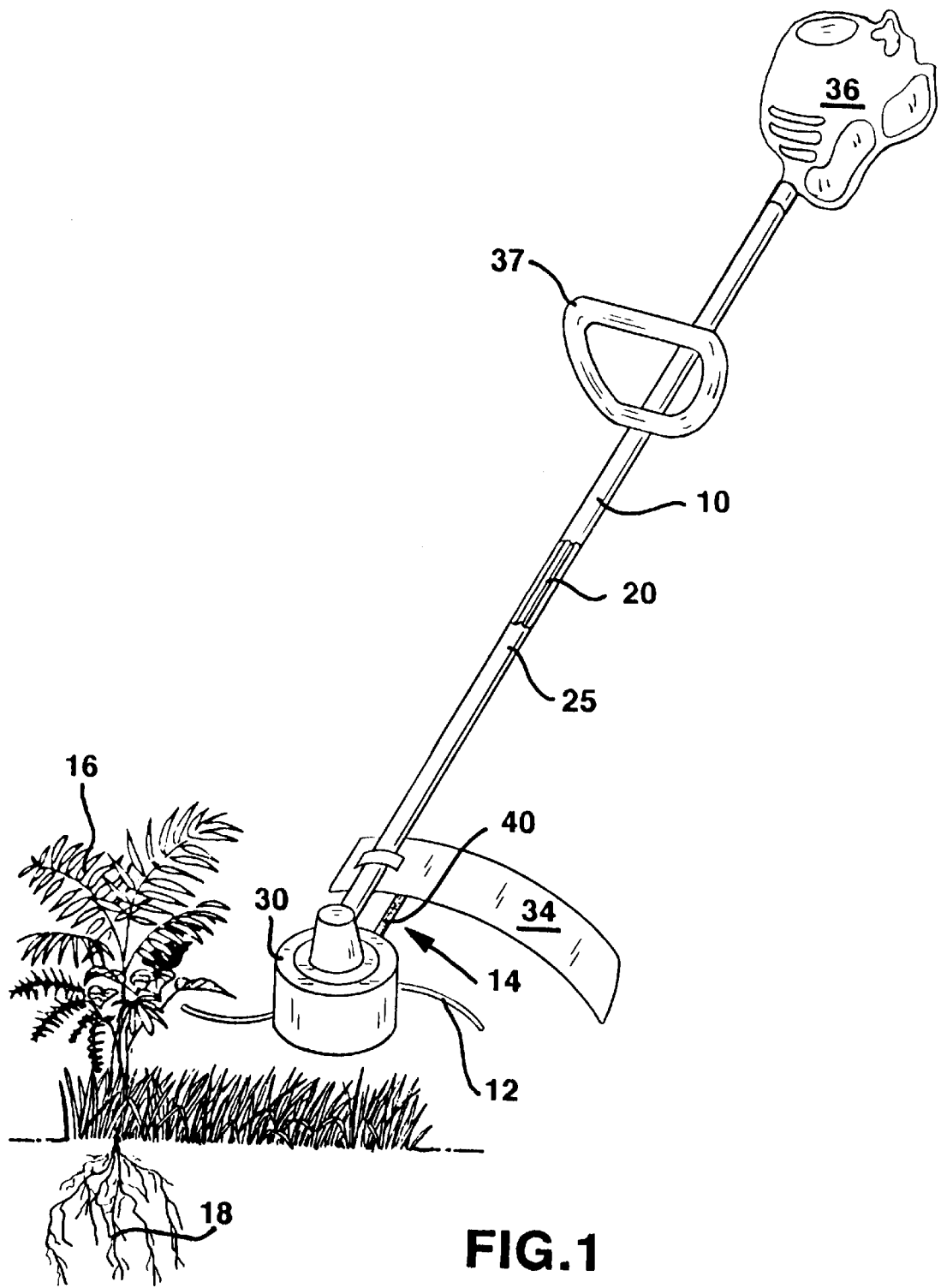
FIG. 1 shows a perspective view of a hand held trimmer and weed electrifier and further shows a weed and the roots of a weed.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various Figures of the drawings, the same numerals designate the same or similar parts. Furthermore, when the terms "inner," "outer," "side," "end," "upper", "lower" and similar terms are used herein, it should be understood that these terms have reference only to the structure shown in the drawings as it would appear to a person viewing the drawings and are utilized only to facilitate describing the preferred embodiments.

DETAILED DESCRIPTION

The invention in general is a weed electrifier 10 which passes electricity through the rotating cutting flexible electrically conductive cable 12 at the distal end of a weed trimmer unit 14 to in turn pass electricity through the weeds 16 being trimmed to kill the roots 18 of the weed 16 or at least stunt the growth of the roots 18 or weed 16 at the same time that the weed 16 is cut.

Figure 2:
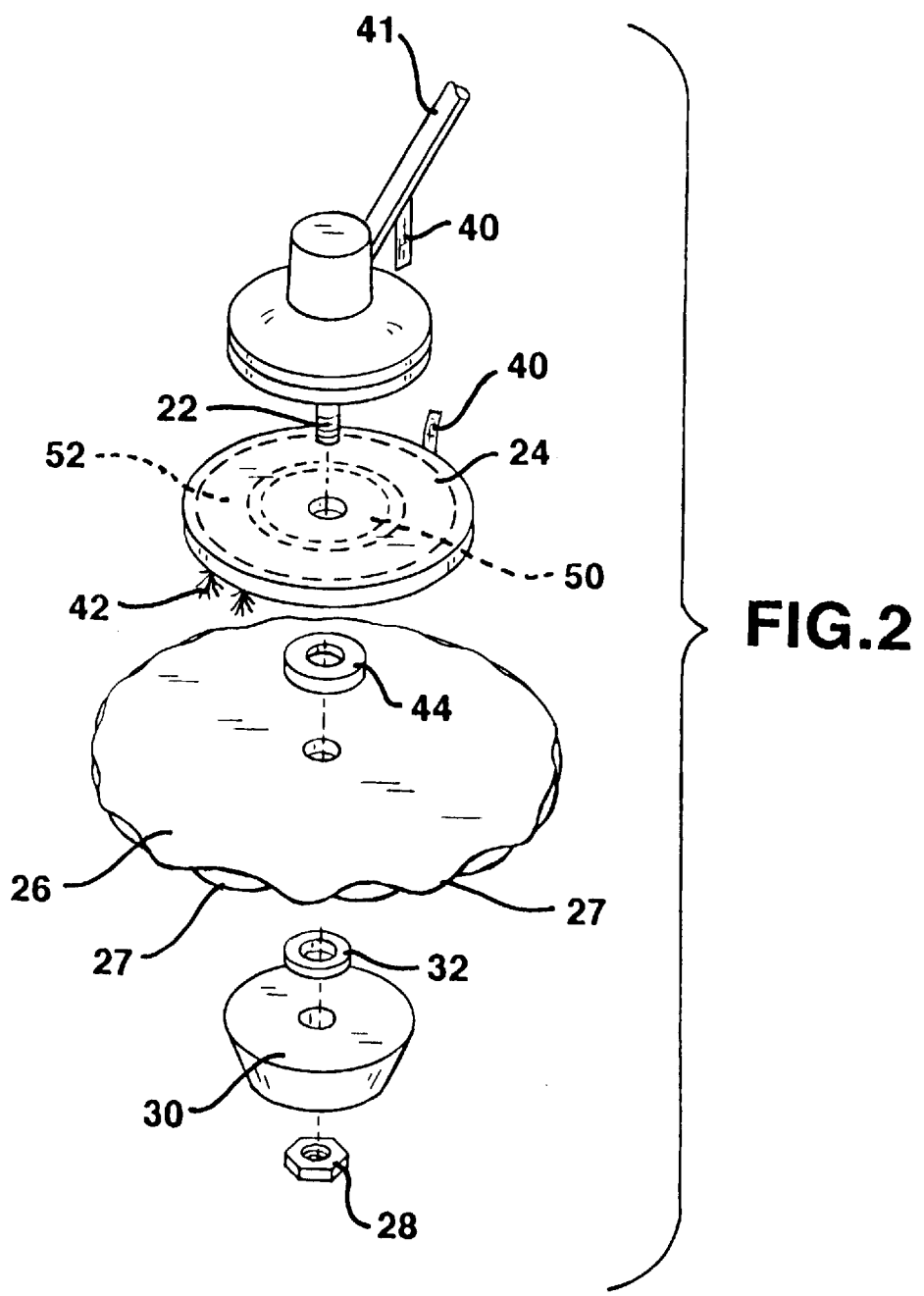
FIG. 2 shows an exploded view of one embodiment of the trimmer and electrifying unit.

As shown in FIG. 2, the rotating drive 20 includes a drive portion 22 to drive the pancake-like generator 24 to generate electricity. The drive 20 is mounted in a shaft or housing 25. The electricity is passed to the cutting tool 26 via a contact such as a brush or brushes 42 and/or via electrical lead lines. The cutting tool 26, formed of an electrical conducting material, passes the electricity into the weeds 18 at the same time that the cutting tool 26 trims the weeds 16. It should be noted that the disk like cutting tool 26 has one or more cutting edges 27 or double serrations 27.

The trimmer unit 14 includes the mounting nut 28, rider 30, thrust washer 32 and deflector 34. The drive means or power unit 36 for the weed trimmer 10 may be a gas engine. The tool 10 further includes a handle 37 affixed to the shaft 25.

The housing 38 for the pancake generator may be fixed via a strap 40 or other means to a stationary portion 41 of the distal end 14 of the weed electrifier 10 so as to keep such from spinning.

Figure 3:
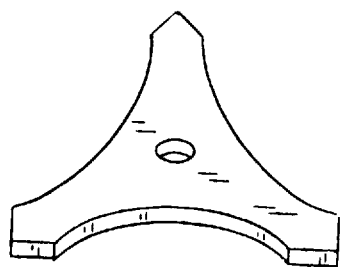
FIGS. 3–5 show perspective views of different types of electrically conducting trimmers or cutting tools or elements.
Figure 4:
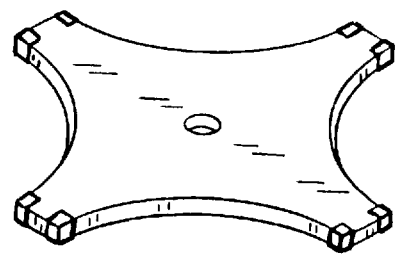
Figure 5:
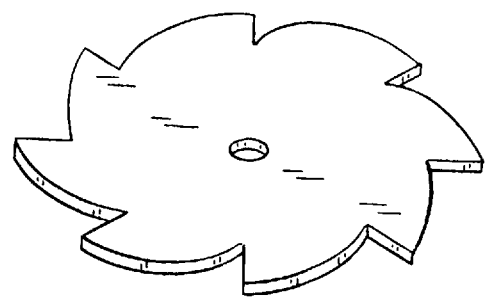

The cutting tools 26 may take a variety of shapes and structures. See FIGS. 3, 4, and 5. The entire perimeter of such tools may be sharpened for cutting, if desired.

This invention is an enhancement of the more familiar weed trimmer in that it not only trims the weed 16 but electrocutes it to kill the weed roots 18. It is possible to kill the weeds 16 and not the grass due to the fact that weeds 16 generally grow taller and faster than grass, thus permitting the electrocution of the weed 16 while not contacting the grass. This eliminates the weekly trimming process after all of the weed seeds have sprouted and been electrocuted. This enhanced trimmer will reduce the use of herbicides and their pollution.

The present invention is a traditional weed trimmer with the addition of a D.C. pancake motor/generator 24 and a contact 42 on the pancake motor/generator 24 utilized to provide electricity to the trimmer cutting instrument 26, to thereby put electrical energy into the plant 16, such as through the sap of the plant or tree and into the roots 18. This effectively electrocutes the plant 16.

Mounting is accomplished by lengthening the mounting stud or drive shaft portion 22 for the cutting or trimming head or housing 30 in order to accommodate the axial thickness of the pancake motor/generator assembly 24, including spacers 44 and bearings. The electrical output or the generator 24 is delivered to a contact or brush 42 which is induced to contact the cutting instrument 26 such as with a spring.

The pancake generator 24 includes a relatively flat or wide magnetic wheel or rotor 50 which is fixed to the drive shaft portion 22. The pancake generator 24 further includes a relatively flat or wide armature winding or stator 52. A housing 54 encompasses the rotor 50 and stator 52. The brushes 42 are electrically connected to the windings of the stator 52. It can be appreciated that, if desired, the stator may rotate and the rotor may be stationary.

This in effect makes the addition of electrocuting the taller weeds an add on feature to practically all weed eater trimmers.

The addition of a strap 40 or other means like a bolt to keep the motor/generator 26 or its housing 30 from spinning to allow it to produce electricity is one of only a few of the add on features of this invention.

The contact brush 42 is easily replaceable.

The generator 24 may require addition bearings on its shaft 22 to allow for the spinning trimmer cutting tool 26 to spin without rubbing the motor/generator 24.

The addition of capacitors may reduce the arcing on the generator brushes 42 and provide greater amperage to electrocute plants with a smaller generator. Mounting the capacitors on the trimmer head shield may provide a cooling means. This arrangement may enable electrifying large weeds whose size is on the order of trees. Electrical treatment may be simultaneous with the step of trimming the bark and cambium all around the trunk base. Electrical treatment by the tool 10 is then applied to the resulting exposed portion.

It should further be noted that the outer elongate hollow shaft or sheath 25, encompassing the drive shaft 20, is formed of a nonconducting material. Also, the drive shaft 20 may be nonconductive, with the drive shaft portion 22 also being nonconductive. Further, diodes may be included in the circuitry in the head 30 to restrict electrical flow to chiefly one direction.

It should also be noted that the rotating cutter 24 may be a metal disk with cutting edges, a metal chain, or a metal cable.

An add-on kit for a conventional weed eater generally includes a generator, and a contact for feeding electricity to the cutter. Further, such an add-on kit may include:

1) a conductive cutter;
2) attachment means for the generator, such as a bolt longer than the bolt or shaft which is conventionally found on a weed eater which affixes the cutter to the weed eater. Such a longer bolt accommodates the added width of the generator.
3) a contact for running up through a protective shield placed over the generator and cutter and then running down past the perimeter of the cutter to the underside of the cutter where the contact engages the cutter.
4) means for holding the contact or conductor in place (spring holding brush or bolt for holding contacts).
5) means for accommodating wear of the contact or conductor (spring loaded contacts or brushes).
6) means for permitting electrical contact regardless of the direction of spin of the cutter (oval springs, arcuate springs, U-shaped springs, each of which with a contact on a bottommost arcuate tangential portion of the spring).
7) means for stabilizing the generator housing on the weed eater (strap or bolt connected to the weed trimmer and generator casing).
8) means for boosting the power of the conventional engine or motor on the conventional weed eater (capacitors, the inclusion of which may lead to a slower walking motion to enable the capacitors to have time to charge up).
9) means for controlling the time of discharge of the capacitors (trigger switch or automatic discharge upon reaching full charge).
10) means for checking the functioning of the generator and/or capacitors (LED light indicating electrical flow).
11) means for determining the amount of current being generated by the generator (volt meter or amp meter).
12) a switch on the handle 37 for turning the generator on and off and electrical leads between such switch and the generator.

As to a cutter blade for the present invention, the entirety of the Hayhurst, Jr. U.S. Pat. No. 4,627,322 is hereby incorporated by reference. Such patent shows a circular saw blade assembly.

As to a pancake generator, the entirety of the Boyer U.S. Pat. No. 4,539,497 is hereby incorporated by reference. This patent shows a pancake armature or, in other words, a pancake generator.

It should be noted that conventional weed eaters include a deflector or protective device or cover over a portion of the cutter blade. The protective device typically extends rearwardly to provide space between the cutter and the operator. If desired, the contact for the cutter may run upwardly from the generator to and through the protective device and then downwardly past the perimeter of the cutter to the underside of the cutter, where it makes electrical engagement therewith. Or, if desired, the contact may run to the upperside of the cutter. Or, if desired, contacts may run to both the underside and upperside of the cutter, whether or not the contacts first run upwardly through the protective device. Running the contact or contacts up through the protective device provides the advantage of visual inspection of the contact being made with the cutter.

It can be appreciated that the present invention permits an individual to selectively eradicate weeds of all sizes in any terrain that the device can traverse. It may take several passes in order to eradicate the sprouts from seedlings and stumps.

Further, if in the form of an add on and removable kit, the trimmer can also be used in conventional fashion (without electricity) to maintain ground cover.

The invention may also be used on trimmers having wheels.

It should be noted that it is preferable to locate the contact 42 or contact point, whether on the lower or upper face of the cutter blade, as close to the central axis of the rotating cutter blade as possible. Such minimizes the wear of the contact against the cutter blade per revolution of the cutter blade.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A portable hand tool for simultaneously trimming and electrifying vegetation, comprising, in combination:
    a) an elongate shaft with a proximal end portion and a distal end portion;
    b) a handle on the proximal end portion for swinging the trimmer back and forth;
    c) a vegetation trimmer unit on the distal end portion, with the trimmer unit comprising a rotating cutter for cutting vegetation, with the rotating cutter comprising a material which is conductive of electricity, and with the tool delivering electricity to the rotating cutter which in turn transfers such electricity to the vegetation.

2. The portable hand tool of claim 1 and further comprising a generator on the tool, with the generator utilizing cutter rotation to generate electricity.

3. The portable hand tool of claim 1 further comprising a power unit on the tool to rotate the cutter.

4. The portable hand tool of claim 3, wherein the power unit is engaged on the proximal end portion of the shaft, wherein the shaft comprises a drive shaft extending between the power unit and the rotating cutter, and wherein the tool further comprises a generator adjacent the distal end portion, with the generator utilizing rotation of the drive shaft to generate electricity for the rotating cutter.

5. A portable hand tool for simultaneously trimming and electrifying vegetation, comprising, in combination:
    a) an elongate shaft with a proximal end portion and a distal end portion;
    b) a handle on the proximal end portion for swinging the trimmer back and forth;
    c) a power unit on the tool;
    d) a drive being rotated by the power unit;
    e) an electrical generator on the tool;
    f) a vegetation trimmer unit on the distal end portion, with the trimmer unit comprising a rotating cutter for cutting vegetation, with the rotating cutter being driven by the drive, with the rotating cutter comprising a material which is conductive of electricity and being electrically connected to the electrical generator; and
    g) wherein the electrical generator generates electricity in response to the drive being rotated by the power unit which in turn transfers such current to the rotating cutter which yet in turn transfers such current to the vegetation.

6. The portable hand tool of claim 5 wherein the distal end of the tool includes a contact between the generator and the rotating cutter to transfer current to the rotating cutter, with the contact being spaced from an axis of the rotating cutter.

7. The portable hand tool of claim 5 wherein the tool includes an electrically insulative portion between the generator and the handle.

8. The portable hand tool of claim 7 wherein the electrically insulative portion comprises the elongate shaft.

9. The portable hand tool of claim 5 wherein the drive is electrically insulative.

10. An improved portable hand tool for trimming vegetation, comprising, in combination: a shaft with a proximal end portion and a distal end portion; a handle on the proximal end portion for swinging the trimmer back and forth; a drive on the shaft; a rotating cutter on the distal end portion for cutting vegetation, with the rotating cutter being driven by rotation of the drive; wherein the improvement comprises, in combination:
    a) a generator on the drive and generating electricity in response to rotation of the drive;
    b) a contact between the generator and the rotating cutter to deliver electricity from the generator to the rotating cutter; and
    c) with the rotating cutter comprising a material which is conductive of electricity such that the rotating cutter carries such electricity to the vegetation being cut.

11. The portable hand tool of claim 10 wherein the drive and generator are disposed on the distal end of the shaft such that the generator is spaced from one operating the hand tool.

12. The portable hand tool of claim 10 wherein the generator comprises a pancake generator whereby axial space on the drive is conserved.

13. The portable hand tool of claim 10 wherein the rotating cutter, drive, and generator have a common axis, with at least the cutter, drive and a portion of the generator rotating about such axis.

14. The portable hand tool of claim 10 wherein the generator comprises a disk like form.

15. The portable hand tool of claim 10 wherein the generator comprises a rotor and a stator, with one of the rotor and stator being fixed to and driven by the drive.

* * * * *